Aug. 14, 1928.

L. C. FENN 1,680,372

PILE SCRAPER

Filed July 5, 1927

Inventor
L. C. Fenn,

By Clarence A. O'Brien
Attorney

Patented Aug. 14, 1928.

1,680,372

UNITED STATES PATENT OFFICE.

LOREN C. FENN, OF CHINOOK, WASHINGTON.

PILE SCRAPER.

Application filed July 5, 1927. Serial No. 203,522.

My invention relates to scrapers for fish trap pilings and has for its object to provide a plurality of scraper blades arranged to circumscribe a fish trap pile or the like, and adapted to be moved vertically upon the pile for the purpose of scraping or removing barnacles, seaweed, or other similar growths therefrom.

The accumulation of such growths upon fish trap pilings not only interferes with the raising and lowering of the net thereon, but also operates to cause undue wear upon the rope supporting the trap which comes into contact with the coated piling, and I accordingly propose a scraper for the piling which may be easily and quickly attached in operative position thereon and which may be moved vertically along the entire length of the piling so as to entirely remove the growth of seaweed and other obstacles therefrom, and thus enable the efficient operation of the net and prevent injury thereto.

Figure 1:
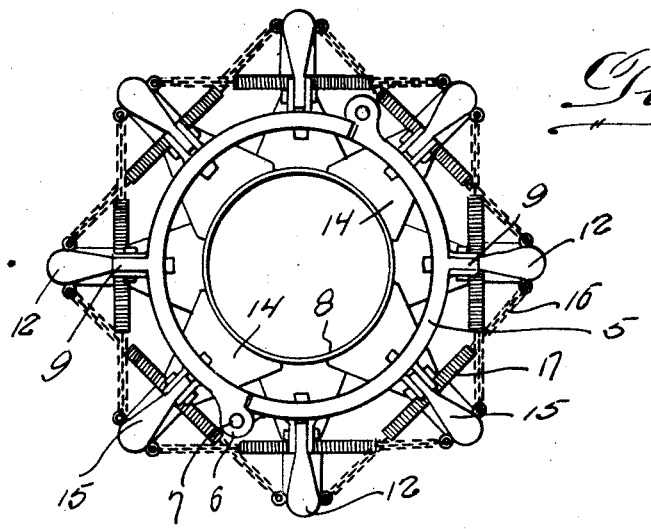
Figure 2:
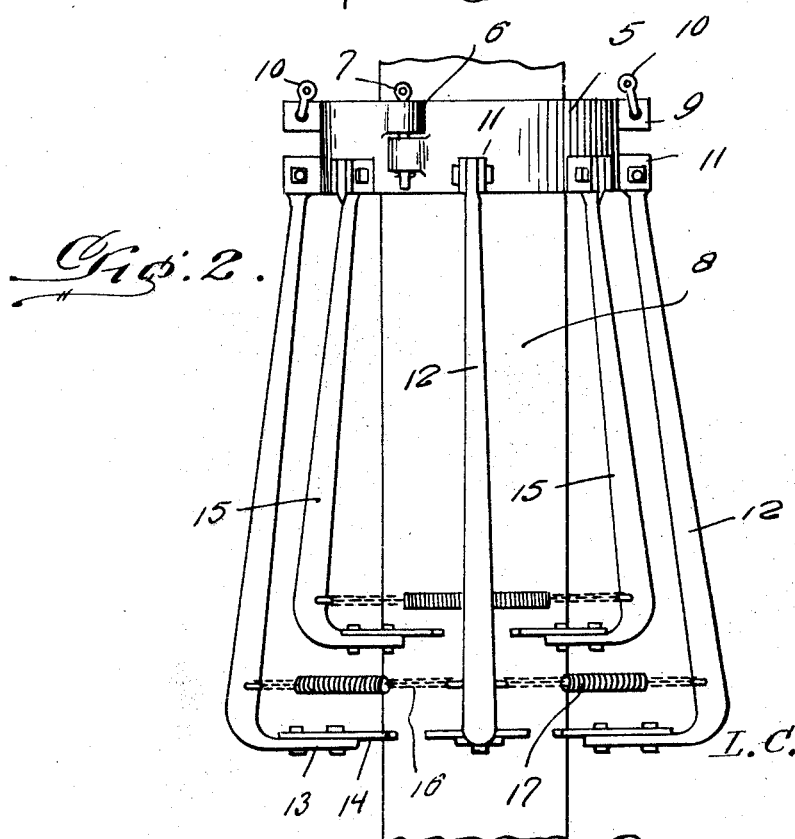

Other objects and advantages reside in the special construction, combination and arrangement of the various elements forming the invention as more fully hereinafter described and claimed, reference being had to the accompanying drawings forming part hereof, wherein:

Figure 1 is a top plan view showing my scraper in operative position upon a piling and, Figure 2 is a side elevational view thereof.

Referring now to the drawings I have disclosed my invention comprising a collar 5 formed of a pair of hinged sections having ears formed at the opposite sides thereof through which openings are formed for receiving a pin 7 whereby to constitute the hinge connection, said collar being of sufficient diameter to permit the free vertical movement thereof upon a piling 8 or the like. At opposite sides of the collar is formed shoulders 9 to which hooks 10 are adapted to be attached for connecting a chain extending upwardly by means of which the collar may be moved vertically upon the pile 8.

Along the lower edge of the collar is arranged a plurality of U-shaped lugs 11 disposed at spaced intervals about the periphery of the collar and between the arms of said lugs is pivotally attached the upper end of scraper arms 12, said arms being arranged to extend downwardly with their lower ends indicated at 13 turned at right angles thereto and extending inwardly toward the pile. A scraper blade 14 is firmly secured to the lower ends 13 of the arms, the blade edge of said scraper being of arcuate formation in order to conform with the contour of the pile 8.

Each alternate scraper arm 12 is of a reduced length whereby to form a set of short arms indicated at 15, each of said short arms being interposed between a pair of the long arms indicated at 12. Except for the reduced length of the short arms the construction thereof is identical with the longer arms and are likewise provided with scraper blades 14. In this manner an upper and a lower set of scraper blades is provided, the blades on the respective sets of arms being staggered in relation and are of sufficient width to overlap each other so that the combined blades will completely circumscribe the piling 8. Therefore, as the scraper is moved vertically along the piling the entire area thereof will be engaged by the scraper blades.

Near the lower end of each arm is attached one end of a section of chain 16 extending horizontally and connected with the adjacent arms of the same type, a coil spring 17 being interposed between the sections of the chain connecting each of the arms whereby to retain the scraping blades in position against the edge of the piling. As illustrated in Figure 1 of the drawing each set of the arms is provided with such chain and spring connections which extend entirely about the pile. In this manner the tension of the blades against the pile is uniformly maintained.

It is obvious that the invention is susceptible to various changes and modifications without departing from the spirit thereof or the scope of the appended claims and I accordingly claim all such forms of the device to which I am entitled.

I claim:

1. In a device of the class described, a plurality of scraper blades arranged in work circumscribing formation in overlapping relation with respect to each other, means connecting said blades for simultaneous movement and converging inducing means for said scrapers.

2. In a device of the class described, a plurality of scrapers arranged in circular formation in overlapping relation and means connecting said scrapers yieldably inducing the convergence thereof.

3. In a pile scraper, a pile encircling collar, a plurality of scraper arms pivotally connected thereto, scraper blades carried by each of said arms and means carried by the arms yieldably engaging the scrapers with the pile.

4. In a pile scraper, a sectional pile encircling collar, a plurality of arms pivotally attached at one end to said collar, scraper blades arranged at the opposite ends of said arms and disposed in overlapping relation with respect to each other and springs yieldably connecting said arms whereby to normally retain the scrapers in engagement with the piles.

5. In a pile scraper, a sectional pile collar having its ends hingedly connected, attaching means for the collar whereby to move the same vertically upon the pile, a plurality of alternately arranged short and long scraper arms pivotally attached at one end to said collar, scraper blades arranged at the lower ends thereof, the blades of one set of arms being arranged in overlapping relation with respect to the blades of the other set of arms and springs connecting the respecting sets of arms whereby to yieldably force the blades into engagement against the pile.

In testimony whereof I affix my signature.

LOREN C. FENN.